United States Patent
Anderson et al.

(10) Patent No.: US 9,710,292 B2
(45) Date of Patent: Jul. 18, 2017

(54) ALLOWING MANAGEMENT OF A VIRTUAL MACHINE BY MULTIPLE CLOUD PROVIDERS

(71) Applicant: International Business Machines Corporation, Armonk, NY (US)

(72) Inventors: Jason L. Anderson, San Jose, CA (US); Gregory J. Boss, Saginaw, MI (US); James P. Busche, San Jose, CA (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 13/957,558

(22) Filed: Aug. 2, 2013

(65) Prior Publication Data
US 2015/0040125 A1 Feb. 5, 2015

(51) Int. Cl.
G06F 9/455 (2006.01)
G06F 9/46 (2006.01)
G06F 15/173 (2006.01)
G06F 9/50 (2006.01)
G06F 9/445 (2006.01)

(52) U.S. Cl.
CPC .......... *G06F 9/455* (2013.01); *G06F 9/45533* (2013.01); *G06F 9/45558* (2013.01); *G06F 9/50* (2013.01); *G06F 9/5005* (2013.01); *G06F 9/5011* (2013.01); *G06F 9/5016* (2013.01); *G06F 9/5027* (2013.01); *G06F 9/5072* (2013.01); *G06F 8/60* (2013.01); *G06F 2009/45595* (2013.01)

(58) Field of Classification Search
None
See application file for complete search history.

(56) References Cited

U.S. PATENT DOCUMENTS 7,574,496 B2   8/2009   McCrory et al.
8,271,653 B2   9/2012   DeHaan
(Continued)

OTHER PUBLICATIONS

Maitland, J., "Keeping Control Isn't Easy", Chapter 4, Cloud-Based Infrastructure, SearchCloudComputing.com, 13 pages.
(Continued)

*Primary Examiner* — Charles Swift
(74) *Attorney, Agent, or Firm* — Maeve M. Carpenter; Hunter E. Webb; Keohane & D'Alessandro PLLC

(57) ABSTRACT

Embodiments of the present invention provide approaches for allowing management of a virtual machine (VM) by multiple cloud providers in a networked computing environment (e.g., a cloud computing environment). Specifically, in a typical embodiment, a system identifies a set of provisioned resources of a VM managed by a first cloud provider, generates a set of artifacts containing information for a second cloud provider to allow co-management of the VM by the first cloud provider and the second cloud provider, and provides access to the set of provisioned resources of the VM to the second cloud provider. As such, a single virtual machine may be managed by multiple (e.g., geographically distinct) cloud providers to cooperatively and selectively execute VM operations because the end product (i.e., VM) from the first and second cloud providers is the same.

17 Claims, 7 Drawing Sheets

(56) References Cited

U.S. PATENT DOCUMENTS

| | | | |
|---|---|---|---|
| 8,271,655 B2 | 9/2012 | Dawson et al. | |
| 8,417,798 B2 | 4/2013 | Chen et al. | |
| 2005/0125537 A1* | 6/2005 | Martins et al. | 709/226 |
| 2011/0055396 A1* | 3/2011 | Dehaan | 709/226 |
| 2011/0126197 A1 | 5/2011 | Larsen et al. | |
| 2011/0137805 A1 | 6/2011 | Brookbanks et al. | |
| 2011/0296022 A1* | 12/2011 | Ferris et al. | 709/226 |
| 2012/0131194 A1* | 5/2012 | Morgan | 709/226 |
| 2012/0166604 A1* | 6/2012 | Fortier | H04L 41/0893 709/223 |
| 2012/0185913 A1* | 7/2012 | Martinez et al. | 726/1 |
| 2012/0281708 A1* | 11/2012 | Chauhan et al. | 370/401 |
| 2012/0297380 A1* | 11/2012 | Colbert | G06F 9/45558 718/1 |
| 2012/0311106 A1* | 12/2012 | Morgan | 709/220 |
| 2013/0031136 A1 | 1/2013 | Shah | |
| 2013/0036213 A1 | 2/2013 | Hasan et al. | |
| 2013/0055261 A1 | 2/2013 | Han et al. | |
| 2013/0060924 A1* | 3/2013 | Zhang | H04L 41/12 709/223 |
| 2013/0066940 A1 | 3/2013 | Shao | |
| 2013/0247034 A1* | 9/2013 | Messerli | 718/1 |
| 2013/0291068 A1* | 10/2013 | Huang et al. | 726/4 |
| 2014/0059226 A1* | 2/2014 | Messerli et al. | 709/226 |

OTHER PUBLICATIONS

Mell, P. et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, Publication Date: Oct. 2009, 19 pages.

* cited by examiner

| MANAGEMENT CONTROL SWITCH BOARD (MCSB) - EXCLUSIVE | | | |
|---|---|---|---|
| CLOUD OPERATION | ORIGINAL CLOUD MANAGEMENT STACK | NEW CLOUD MANAGEMENT STACK #1 | NEW CLOUD MANAGEMENT STACK #2 |
| START / STOP / RESTART VM | ✗ | ✗ | ➘ |
| CAPTURE VM | ➘ | ✗ | ✗ |
| APPLY FIXPACKS TO VM | ✗ | ✗ | ➘ |
| RECONFIGURE VM (CHANGE MEMORY, CPU ETC.) | ➘ | ✗ | ✗ |
| INJECT SCRIPTS, KEYS, AGENTS, AND OTHER ARTIFACTS IN VM | ✗ | ➘ | ✗ |
| DELETE VM | ➘ | ✗ | ✗ |

FIG. 5

| MANAGEMENT CONTROL SWITCH BOARD (MCSB) - DELEGATION | | | |
|---|---|---|---|
| CLOUD OPERATION | ORIGINAL CLOUD MANAGEMENT STACK | NEW CLOUD MANAGEMENT STACK #1 | NEW CLOUD MANAGEMENT STACK #2 |
| START / STOP / RESTART VM | ✔ | ✘ | ✔ |
| CAPTURE VM | ✔ | ✘ | ✘ |
| APPLY FIXPACKS TO VM | ✔ | ✔ | ✘ |
| RECONFIGURE VM (CHANGE MEMORY, CPU ETC.) | ✔ | ✘ | ✔ |
| INJECT SCRIPTS, KEYS, AGENTS, AND OTHER ARTIFACTS IN VM | ✔ | ✔ | ✘ |
| DELETE VM | ✔ | ✘ | ✘ |

ALLOWING MANAGEMENT OF A VIRTUAL MACHINE BY MULTIPLE CLOUD PROVIDERS

TECHNICAL FIELD

In general, embodiments of the present invention relate to virtual machine (VM) management. Specifically, embodiments of the present invention relate to approaches for allowing management of a VM by multiple cloud providers in a networked computing environment (e.g., a cloud computing environment).

BACKGROUND

With cloud computing technologies maturing, and customers gaining experience, many customers are looking for ways to incorporate additional services from multiple cloud vendors. The reasons for this change is driven by many factors including price and new capabilities offered by other cloud providers. However, some businesses will not want to, or not be able to, adequately migrate existing VMs from one cloud to another in order to gain these additional services.

SUMMARY

In general, embodiments of the present invention provide approaches for allowing management of a virtual machine (VM) by multiple cloud providers in a networked computing environment (e.g., a cloud computing environment). Specifically, in a typical embodiment, a system identifies a set of provisioned resources of a VM managed by a first cloud provider, generates a set of artifacts containing information for a second cloud provider to allow co-management of the VM by the first cloud provider and the second cloud provider, and provides access to the set of provisioned resources of the VM to the second cloud provider. As such, a single virtual machine may be managed by multiple (e.g., geographically distinct) cloud providers to cooperatively and selectively execute VM operations because the end product (i.e., VM) from the first and second cloud providers is the same. Based on shared access policies and a universal adapter, a cloud artifact need not rely solely on the first cloud provider for lifecycle operations.

A first aspect of the present invention provides a computer-implemented method for allowing management of a virtual machine (VM) by multiple cloud providers in a networked computing environment, the method comprising: identifying a set of provisioned resources of a VM managed by a first cloud provider; generating a set of artifacts containing information for a second cloud provider to allow co-management of the VM by the first cloud provider and the second cloud provider; and providing access to the set of provisioned resources of the VM to the second cloud provider.

A second aspect of the present invention provides a system for allowing management of a virtual machine (VM) by multiple cloud providers in a networked computing environment, the system comprising: a memory medium comprising instructions; a bus coupled to the memory medium; and a processor coupled to the bus that when executing the instructions causes the system to: identify a set of provisioned resources of a VM managed by a first cloud provider; generate a set of artifacts containing information for a second cloud provider to allow co-management of the VM by the first cloud provider and the second cloud provider; and provide access to the set of provisioned resources of the VM to the second cloud provider.

A third aspect of the present invention provides a computer program product for allowing management of a virtual machine (VM) by multiple cloud providers in a networked computing environment, the computer program product comprising a computer readable storage media, and program instructions stored on the computer readable storage media, to: identify a set of provisioned resources of a VM managed by a first cloud provider; generate a set of artifacts containing information for a second cloud provider to allow co-management of the VM by the first cloud provider and the second cloud provider; and provide access to the set of provisioned resources of the VM to the second cloud provider.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a set of metadata and management access polices according to an embodiment of the present invention;

FIG. 6 depicts a set of metadata and management access polices according to an embodiment of the present invention.

Figure 1:
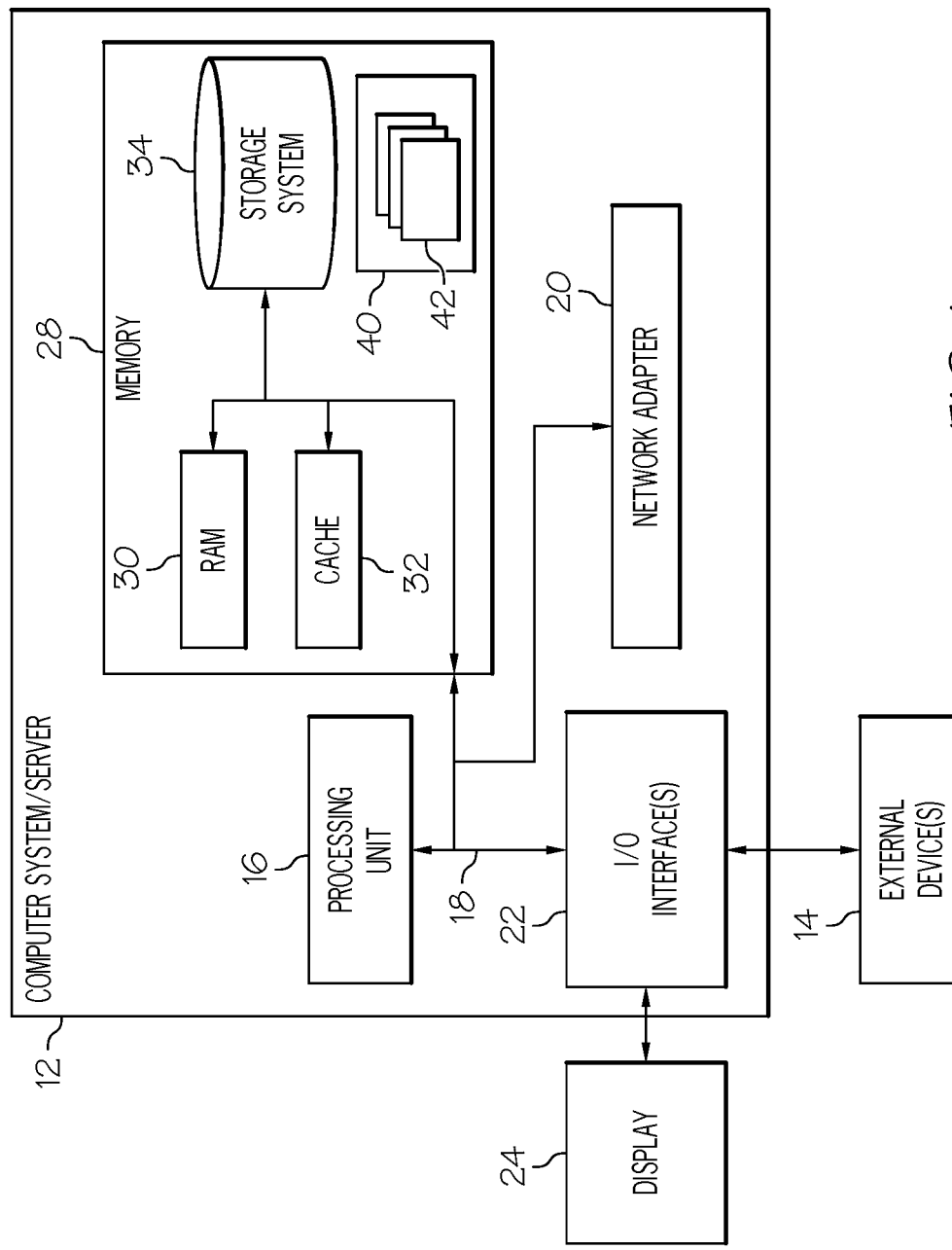
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set"

is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide approaches for allowing management of a virtual machine (VM) by multiple cloud providers in a networked computing environment (e.g., a cloud computing environment). Specifically, in a typical embodiment, a system identifies a set of provisioned resources of a VM managed by a first cloud provider, generate a set of artifacts containing information for a second cloud provider to allow co-management of the VM by the first cloud provider and the second cloud provider; and provide access to the set of provisioned resources of the VM to the second cloud provider. As such, a single virtual machine may be managed by multiple (e.g., geographically distinct) cloud providers to cooperatively and selectively execute VM operations because the end product (i.e., VM) from the first and second cloud providers is the same. Based on shared access policies and a universal adapter, a cloud artifact need not rely solely on the first cloud provider for lifecycle operations.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
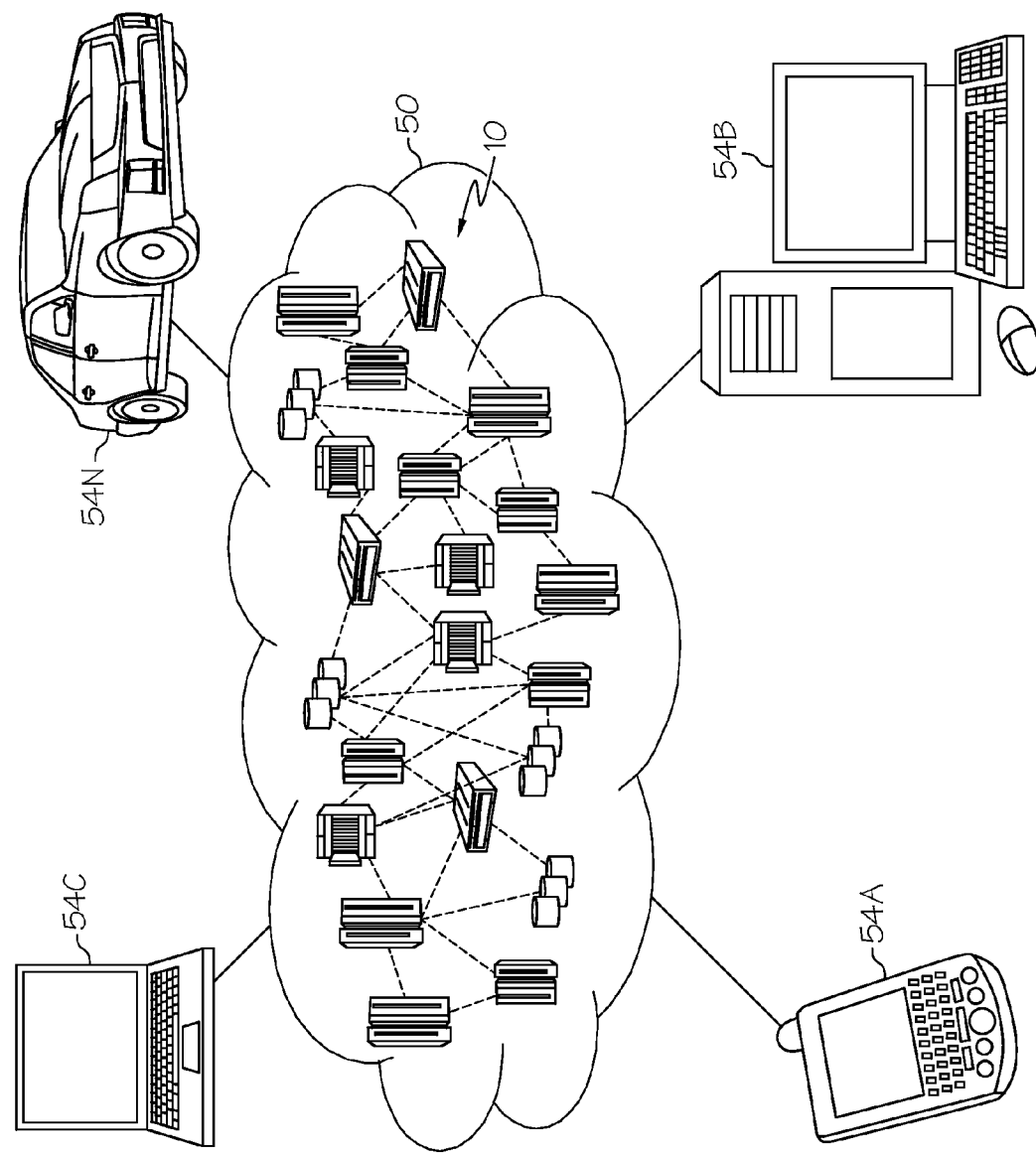
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
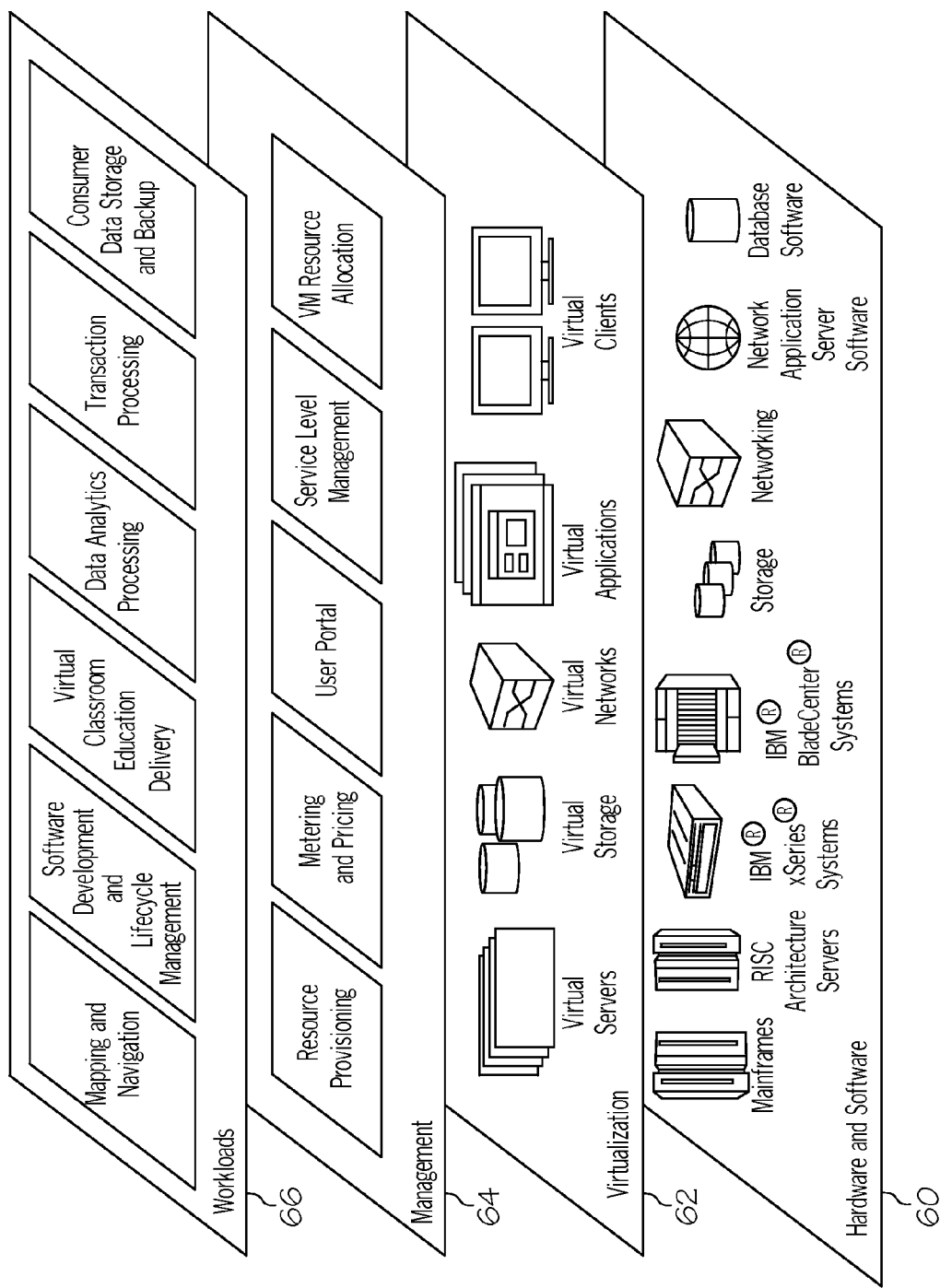
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is command identification, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the VM resource allocation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
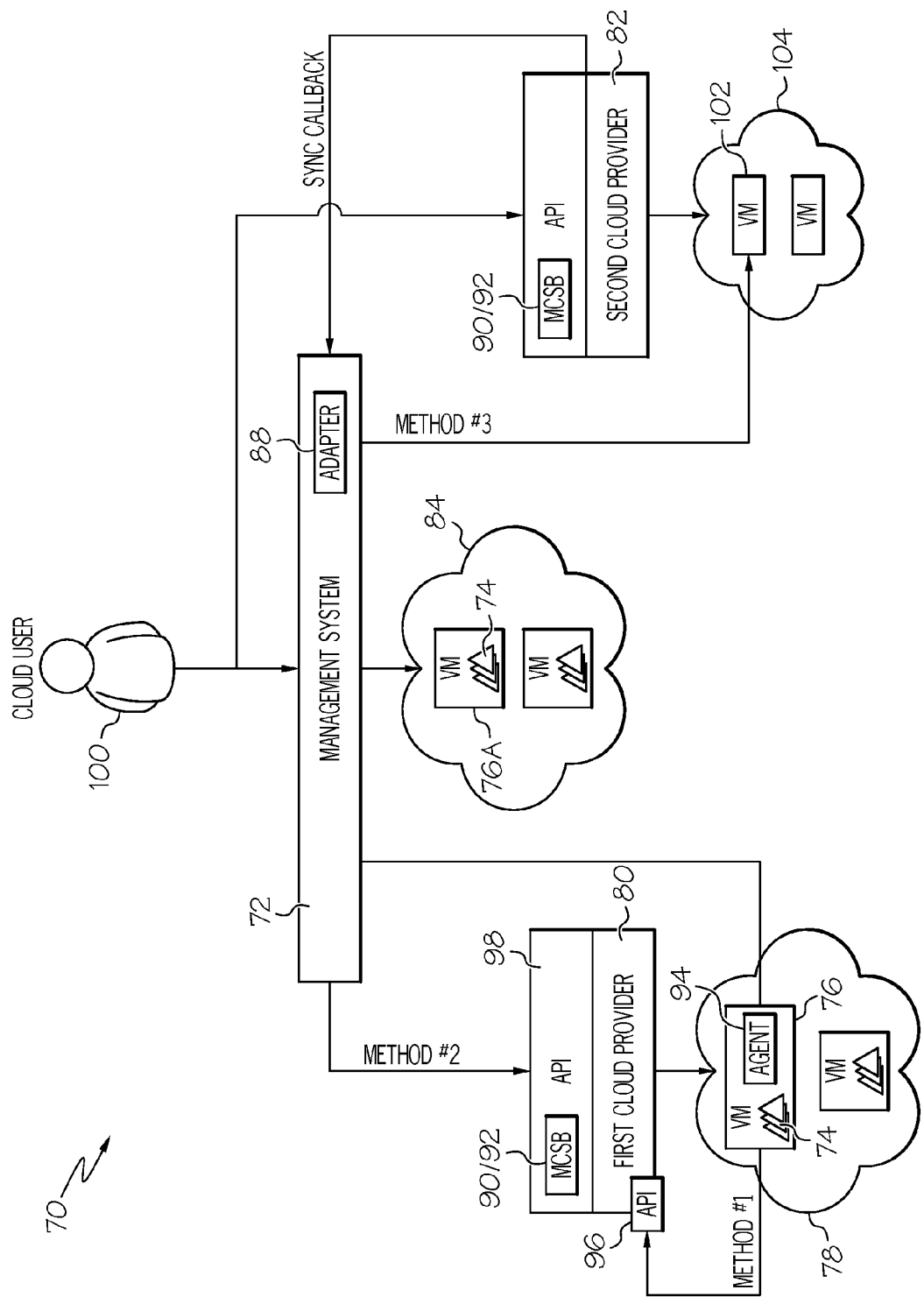
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70. Networked computing environment 70 comprises a management system 72 for allowing management of one or more VMs by multiple cloud providers (e.g., located in different geographical areas). In general, management system 72 can be implemented as program/utility on computer system 12 of FIG. 1 and can enable the functions recited herein. It is further understood that management system 72 may be incorporated within or work in conjunction with any type of system that allows co-management of VM resources by multiple cloud providers. Such other system(s) have not been shown in FIG. 4 for brevity purposes.

Along these lines, management system 72 may perform multiple functions similar to a general-purpose computer. Specifically, among other functions, management system 72 may: identify a set of provisioned resources 74 of VM 76 in cloud 78 managed by a first cloud provider 80; generate a set of artifacts (e.g., VM 76A) containing information for a second cloud provider 82 to allow co-management of VM 76 by both first cloud provider 78 and second cloud provider 82; and provide access to set of provisioned resources 74 (e.g., at cloud 84) of VM 76 to second cloud provider 84. In one embodiment, management system 72 comprises an adapter 88 (e.g., a universal VM adapter) that can automatically detect corresponding infrastructure and network settings associated with each VM of networked computing environment 70, and based on the specific cloud provider, can generate a set of artifacts (e.g., VM 76A) containing the information for the cloud provider (e.g., second cloud provider 82) to partially manage the underlying VM 76, even though VM 76 is originally provisioned by first cloud provider 80.

Management system 72 is further configured to generate a set of metadata and management access policies that define access to and management of each VM of networked computing environment 70 between first cloud provider 80 and second cloud provider 82. This is demonstrated by a management control switch board 90 (MCSB) shown in FIG. 5. In this embodiment, MCSB 90 defines a set of exemplary management actions between first cloud provider 80 and second cloud provider 82, as well as the roles and controls exclusive to them, and shared between them. For example, MCSB 90 outlines a number of exemplary cloud operations including, but not limited to, starting/stopping/restarting a VM, capturing VM, applying fixpacks to VM, reconfiguring VM, injecting scripts, keys, agents and other artifacts into VM, and deleting the VM.

MCSB 90 demonstrates an "exclusive" MCSB used when first cloud provider 80 is capable of giving up some VM control over the provisioned VM Resources, while MCSB 92 of FIG. 6 demonstrates a "delegation" MCSB that is used in cases where the first cloud provider 80 is either incapable or currently unwilling to give up VM control over provisioned VM resources (e.g., resources 74). For example, first cloud provider 80 may want to retain restart control to help with security compliance. When delegation MCSB 92 is employed, a "sync callback" function can be used to allow multiple providers to coordinate activities so as not to cause inconsistencies or incompatibilities. Management system 72, in coordination with MCSB 92, resolves any conflict(s) between a management activity initiated by first cloud provider 80 and a management activity initiated by second cloud provider 82. For example, a conflict may arise if first cloud provider 80 issues a command (e.g., via an internal cloud management system) to apply a security patch, while at the same time second cloud provider 82 issues (e.g., via an internal cloud management system) a shut down or restore command, which could cause an inconsistent state. The sync callback function ensures that if MCSB 92 allows more than one cloud provider to perform a function, that each cloud provider communicates to the other the commands, in what order, and at what times they are being issued, so that the cloud providers can collectively coordinate those commands in a cohesive manner.

ILLUSTRATIVE EXAMPLES

This section will describe illustrative examples of different scenarios in which the embodiments of the present invention can be carried out. It is understood in advance that the teachings recited herein are not intended to be limited to any particular scenario.

Example #1

Control Via an Agent Installed on a Target VM

Referring again to FIG. 4, an approach having an agent 94 incorporated within a VM (e.g., VM 76) will be described. In this example, management system 72 first identifies VM 76 to be brought under the scope of a workload developer and/or a pure application system of cloud 84. Next, a network connectivity is verified from each cloud management stack of first cloud provider 80 and second cloud provider 82, one or both of which will be managing VM 76.

Universal VM adapter 88 is configured to then collect the user ID/password of the underlying VM 76, and insert itself into VM 76 to analyze and discover corresponding information. In one embodiment, a representational state transfer (REST) API 96 analyzes and collects OS configuration information of each node (e.g., hypervisor. disk, memory, CPU, architecture, speed, etc.), and then discovers and analyzes the network attributes of the VM (e.g., VLAN, IPs etc.). Based on the data collected, Universal VM Adapter 88 uses the attributes and hypervisor information to execute appropriate actions to be taken. Universal VM Adapter 88 may also use a permissions file based on MCSB 90/92, and allow a certain set of VM operations based on that.

Example #2

Direct Method Calls to a Standardized API

Another approach to integrate new cloud 84 with the original cloud 78 is to use API 98 of first cloud provider 80. In this way, when an operation is triggered via new cloud 84, new cloud 84 simply checks MCSB 90/92 of API 98 (or equivalent permissions file) and determines which appropriate API call to make for the original operation. In this example, a user 100 requests a VM resource that requires integration of original cloud 78 with a new cloud management stack of management system 72. The original cloud management stack of first cloud provider 80 may allow new user 100 based on the permissions defined in its MCSB 90/92. User 100 then identifies the list of VMs to be brought under management of management system 72, and new cloud 84 then allows operations to be performed on these VMs as defined in its permission controls. For each operation, the appropriate command is called in API 98.

Example #3

Direct VM Control from Adopter Cloud

In this example, management system 72 logs-in directly to manage VMs. Specifically, management system 72 first identifies the list of VMs (e.g., VM 102 of cloud 104) to be brought under its control, and ensures network connectivity with second cloud provider 82. User access/information is then obtained, e.g., from MCSB 90/92 of second cloud provider 82, which contains user ID and command/security requirements. In this embodiment, one of two possibilities for access could be used. Either a root user, or a non-root user, is provided with a SSH key or the password. Proper SUDO (substitute user do) authority rights are then given, e.g., to the following commands: reboot, halt, shutdown, uptime, etc.

At this point, management system 72 can login via user/password or user/SSH key to issue operating system commands like shutdown or reboot. Furthermore, this may give adopter cloud (e.g., cloud 84) access to additional information, like memory size, CPU quantity, uptime, etc.

Figure 7:
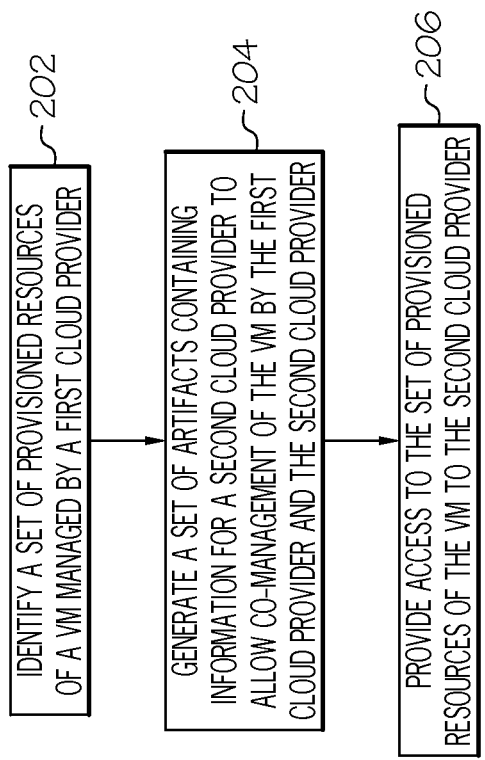
FIG. 7 depicts a method flow diagram according to an embodiment of the present invention.

Referring now to FIG. 7, a method flow 200 according to an embodiment of the present invention is shown. At 202, a set of provisioned resources of a VM managed by a first cloud provider are identified. At 204, a set of artifacts containing information for a second cloud provider is generated to allow co-management of the VM by the first cloud provider and the second cloud provider. At 206, access to the set of provisioned resources of the VM is provided to the second cloud provider.

Method flow 200 of FIG. 7 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as VM co-management solution, it is understood that the invention further provides various alternative embodiments. For example, in one embodiment, the invention provides a computer-readable/useable medium that includes computer program code to enable a computer infrastructure to provide command identification functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide command identification functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for co-management of a VM. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for allowing management of a virtual machine (VM) by multiple cloud providers in a networked computing environment, comprising:
identifying a set of provisioned resources of a VM managed by the first cloud provider;
detecting infrastructure and network settings associated with the VM;
generating a set of artifacts from the infrastructure and network settings that contain information specific to a second cloud provider to allow co-management of the VM by the first cloud provider and the second cloud provider;
providing access to the set of provisioned resources of the VM to the second cloud provider;
delegating, to the first cloud provider, a first set of management actions;
delegating, to the second cloud provider, a second set of management actions previously provided by the first cloud provider, wherein the first set of management actions and the second set of management actions are different from one another, and wherein each management action of the first set of management actions and the second set of management actions manages an execution of the VM on the first cloud provider;
receiving a first command that implements one of the first set of management actions, from the first cloud provider, for the VM;
receiving, from the first cloud provider, a communication including the first command, an order of the first command with respect to other commands, and a time at which the first command is issued;
receiving a second command that implements one of the second set of management actions, from the second cloud provider, for the VM, wherein the second command is in conflict with the first command;
receiving, from the second cloud provider, a communication including the second command, an order of the second command with respect to other commands, and a time at which the second command is issued;
resolving the conflict between the first command and the second command, using a synch callback function;
executing the first command or the second command based on the resolution, and
executing, in response to a completion of the executing, a non-executed one of the first command or the second command.

2. The computer-implemented method of claim 1, further comprising generating a management control switch board (MCSB) having a set of metadata and management access policies that define access to and management of the VM for the first cloud provider and the second cloud provider, the MCSB having the first set of management actions delegated to the first cloud provider and the second set of management actions delegated to the second cloud provider.

3. The computer-implemented method of claim 2, further comprising executing one or more VM operations based on the set of metadata and management access policies.

4. The computer-implemented method of claim 1, further comprising providing an adapter to detect the infrastructure and network settings associated with the VM.

5. The computer-implemented method of claim 1, the providing access to the set of provisioned resources of the VM to the second cloud provider comprising at least one of the following: installing an agent within the VM, and directing a method call to a standardized API of the first cloud provider.

6. The computer-implemented method of claim 1, the networked computing environment comprising a cloud computing environment.

7. A system for allowing management of a virtual machine (VM) by multiple cloud providers in a networked computing environment, the system comprising:
a memory medium comprising instructions;
a bus coupled to the memory medium; and
a processor coupled to the bus that when executing the instructions causes the system to:
identify a set of provisioned resources of a VM managed by the first cloud provider;
detect infrastructure and network settings associated with the VM;
generate a set of artifacts from the infrastructure and network settings that contain information specific to a second cloud provider to allow co-management of the VM by the first cloud provider and the second cloud provider;
provide access to the set of provisioned resources of the VM to the second cloud provider;
delegate, to the first cloud provider, a first set of management actions;
delegate, to the second cloud provider, a second set of management actions previously provided by the first cloud provider, wherein the first set of management actions and the second set of management actions are different from one another, and wherein each management action of the first set of management actions and the second set of management actions manages an execution of the VM on the first cloud provider;
receive a first command that implements one of the first set of management actions, from the first cloud provider, for the VM;
receive, from the first cloud provider, a communication including the first command, an order of the first command with respect to other commands, and a time at which the first command is issued;
receive a second command that implements one of the second set of management actions, from the second cloud provider, for the VM, wherein the second command is in conflict with the first command;
receive, from the second cloud provider, a communication including the second command, an order of the second command with respect to other commands, and a time at which the second command is issued;
resolve the conflict between the first command and the second command, using a synch callback function;
execute the first command or the second command based on the resolution, and
execute, in response to a completion of the executing, a non-executed one of the first command or the second command.

8. The system of claim 7, the instructions further causing the system to generate a management control switch board (MCSB) having a set of metadata and management access policies that define access to and management of the VM for the first cloud provider and the second cloud provider, the MCSB having the first set of management actions delegated to the first cloud provider and the second set of management actions delegated to the second cloud provider.

9. The system of claim 8, the instructions further causing the system to execute one or more VM operations based on the set of metadata and management access policies.

10. The system of claim 7, the instructions further causing the system to provide an adapter to detect the infrastructure and network settings associated with the VM.

11. The system of claim 7, the instructions causing the system to provide access to the set of provisioned resources of the VM to the second cloud provider comprising at least one of the following: installing an agent within the VM, and directing a method call to a standardized API of the first cloud provider.

12. The system of claim 7, the networked computing environment comprising a cloud computing environment.

13. A computer program product for allowing management of a virtual machine (VM) by multiple cloud providers in a networked computing environment, the computer program product comprising a computer readable storage media, and program instructions stored on the computer readable storage media, to:
identify a set of provisioned resources of the VM managed by a first cloud provider;
detect infrastructure and network settings associated with the VM;
generate a set of artifacts from the infrastructure and network settings that contain information specific to a second cloud provider to allow co-management of the VM by the first cloud provider and the second cloud provider;
provide access to the set of provisioned resources of the VM to the second cloud provider;
delegate, to the first cloud provider, a first set of management actions;
delegate, to the second cloud provider, a second set of management actions previously provided by the first cloud provider, wherein the first set of management actions and the second set of management actions are different from one another, and wherein each management action of the first set of management actions and the second set of management actions manages an execution of the VM on the first cloud provider;
receive a first command that implements one of the first set of management actions, from the first cloud provider, for the VM;
receive, from the first cloud provider, a communication including the first command, an order of the first command with respect to other commands, and a time at which the first command is issued;
receive a second command that implements one of the second set of management actions, from the second cloud provider, for the VM, wherein the second command is in conflict with the first command;
receive, from the second cloud provider, a communication including the second command, an order of the second command with respect to other commands, and a time at which the second command is issued;

resolve the conflict between the first command and the second command, using a synch callback function;

execute the first command or the second command based on the resolution, and execute, in response to a completion of the executing, a non-executed one of the first command or the second command.

14. The computer program product of claim 13, the computer readable storage media further comprising instructions to generate a management control switch board (MCSB) having a set of metadata and management access policies that define access to and management of the VM for the first cloud provider and the second cloud provider, the MCSB having the first set of management actions delegated to the first cloud provider and the second set of management actions delegated to the second cloud provider.

15. The computer program product of claim 13, the computer readable storage media further comprising instructions to provide an adapter to detect the infrastructure and network settings associated with the VM.

16. The computer program product of claim 14, the computer readable storage media further comprising instructions to execute one or more VM operations based on the set of metadata and management access policies.

17. The system of claim 13, the computer readable storage media further comprising instructions to provide access to the set of provisioned resources of the VM to the second cloud provider comprising at least one of the following: installing an agent within the VM, and directing a method call to a standardized API of the first cloud provider.

\* \* \* \* \*